United States Patent [19]
Janning

[11] 3,944,331
[45] Mar. 16, 1976

[54] LIQUID CRYSTAL DISPLAY DEVICE

[75] Inventor: John L. Janning, Dayton, Ohio

[73] Assignee: NCR Corporation, Dayton, Ohio

[22] Filed: Sept. 5, 1974

[21] Appl. No.: 503,235

Related U.S. Application Data

[63] Continuation of Ser. No. 306,352, Nov. 13, 1972, abandoned.

[52] U.S. Cl............................ 350/160 LC; 350/150
[51] Int. Cl.²......................................... G02F 1/13
[58] Field of Search..................... 350/150, 160 LC

[56] References Cited
UNITED STATES PATENTS

| | | | |
|---|---|---|---|
| 3,067,413 | 12/1962 | Fischle et al.................... | 350/150 X |
| 3,622,224 | 11/1971 | Wysocki et al..................... | 350/150 |
| 3,700,306 | 10/1972 | Cartmell et al.................... | 350/150 |
| 3,701,122 | 10/1972 | Geusic et al................ | 350/150 UX |
| 3,834,792 | 9/1974 | Janning......................... | 350/160 LC |

*Primary Examiner*—Edward S. Bauer
*Attorney, Agent, or Firm*—J. T. Cavender; Lawrence P. Benjamin

[57] ABSTRACT

A liquid crystal display device having a series of transparent panels, the inner surface of each panel successively supporting a transparent electrode film and an alignment film which sympathetically aligns crystals of liquid crystal material into the direction of film growth. The alignment films have their directions of alignment alternately pointing in the horizontal or vertical direction. Liquid crystal material is placed between adjacent alignment films to form a series of liquid crystal display cells. A character may be formed by certain transparent electrodes in the device. To read out a selected character from the device, the liquid crystal display device is placed between a light polarizer and a light analyzer. With an even number of cells in the device, the polarizer and analyzer are crossed to produce a dark background. The crystals of the unenergized cells, having crossed alignment films in them, will rotate polarized light which is passing through them by 90°. When a voltage is applied across one of the cells, the crystals in that cell will not rotate polarized light passing through the area of a character in that cell. However polarized light will continue to be rotated by the remainder of that cell. The polarized light passing through the area of the character of the energized cell is 90° out of phase with the other light passing through the device. Therefore only the light in phase with the analyzer will pass through the analyzer. Any character in the device may be displayed by energizing its corresponding cell.

7 Claims, 5 Drawing Figures

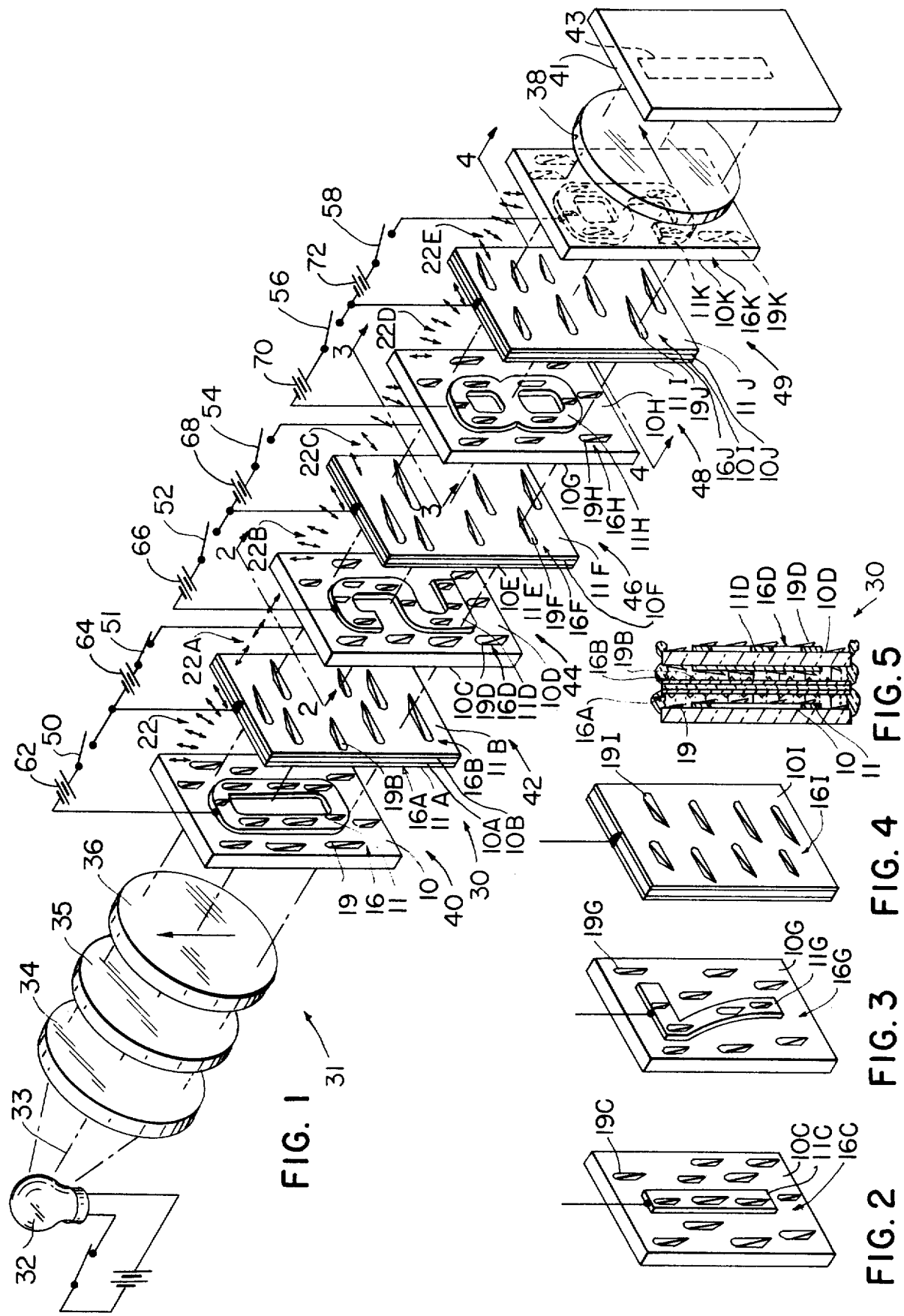

LIQUID CRYSTAL DISPLAY DEVICE

BACKGROUND OF THE INVENTION

This is a continuation of application Ser. No. 306,352, filed Nov. 13, 1972, and now abandoned.

Joseph J. Wysocki in U.S. Pat. No. 3,622,224, issued Nov. 23, 1971, discloses a liquid crystal device having a plurality of liquid crystal display cells therein. Transparent electrodes are placed upon adjacent surfaces of transparent panels, with a numeral formed by one of the adjacent transparent electrodes of each cell, and liquid crystal material placed between the adjacent transparent electrodes of each cell. Unpolarized light is passed through the device to read out a numeral. When a voltage is placed onto adjacent transparent electrodes of a cell of the device, the unpolarized light will be scattered by the crystals of the liquid crystal material between the numeral and the other transparent electrode of the selected cell. One can thus see the numeral which has been formed by the transparent electrode of the selected cell.

The present applicant shows a liquid crystal display device whose crystals rotate polarized light a selected number of times. The device has several liquid crystal display cells therein, each cell having adjacent transparent panels with transparent electrodes thereon, one of the adjacent transparent electrodes forming a numeral or other character. The transparent electrodes have oriented alignment films on them, as described in U.S. patent application Ser. No. 242,675, filed on Apr. 10, 1972 and which issued on Sept. 10, 1974, as U.S. Pat. No. 3,834,792 to the present applicant and assignee to the present assignee. The alignment films influence the rotation of the crystals of the separate liquid crystal display cells by a given angle such as 90° and the rotated liquid crystals rotate polarized light passing through them.

To read out a chosen character from applicant's device, a polarizer and analyzer are placed at either end of the device. These polarizers are crossed when there are an even number of cells in the device. Applicant's device then rotates polarized light passing through it by an even number of times by the rotated crystals of the separate cells when applicant's device is not energized. Polarized light passing through the transparent electrode character of a cell on which a voltage is placed is not rotated by the crystals of the energized cell since the crystals of this cell do not rotate the light, but rotate light passing through the remainder of the energized cell. Polarized light in the area of the transparent character of the energized cell comes out of the analyzer. Applicant's device allows multiple rotating of polarized light as it passes through the device, to either pass or not pass out as a light pattern of a character of a selected cell, depending on whether or not that selected cell is energized.

Wysocki does not show a liquid crystal device having alignment means on transparent electrodes with the alignment means having periodically alternating directions to rotate crystals of liquid crystal material through the device. Wysocki does not use selective rotation to display any of several characters from a liquid crystal display device.

SUMMARY OF THE INVENTION

The present invention relates to a liquid crystal display device comprising a plurality of transparent support panels positioned in parallel planes along a common axis; a transparent electrode film deposited on adjacent surfaces of the support panels to form selected patterns; alignment means disposed on the transparent electrode films in alternating alignment directions, and liquid crystal material having elongated crystals which have longitudinal axes adjacent the alignment means, the elongated crystals of the liquid crystal material adjacent each alignment means having their longitudinal axes oriented in the alignment direction of that alignment means.

The object of the present invention is to provide a liquid crystal device for housing several numerals therein.

Another object of the present invention is to provide a liquid crystal display device from which any of several numerals housed therein may be read out.

DESCRIPTION OF THE DRAWINGS

FIG. 1 is a perspective view of a liquid crystal display device having several numerals housed therein.

FIG. 2 is a plan view of a numeral 1 formed by a transparent electrode of the device of FIG. 1 having an alignment film thereon.

FIG. 3 is a plan view of a numeral 7 formed by a transparent electrode of the device of FIG. 1 having an alignment film thereon.

FIG. 4 is a plan view of a transparent electrode having an alignment film thereon.

FIG. 5 is a sectional view of a liquid crystal display device having two liquid crystal display cells therein.

DESCRIPTION OF THE PREFERRED EMBODIMENT

FIG. 1 is an isometric view which illustrates a fabricated liquid crystal display device 30 having liquid crystal cells 40, 42, 44, 46, 48 and 49 in it. Transparent panels such as glass panels having surfaces 10, 10A, 10B, 10C, 10D, 10E, 10F, 10G, 10H, 10I, 10J and 10K are stacked in the liquid crystal display device 30, and have transparent electrode films 11, 11A, 11B, 11C, 11D, 11E, 11F, 11H, 11I, 11J and 11K respectively on these surfaces. The transparent electrodes may be made of thin tin oxide films, thin indium oxide films or thin cadmium oxide films. Nematic liquid crystal material is placed between adjacent electrode films. The liquid crystal material has elongated crystals in it. A numeral is formed by electrode films 11, 11C, 11D, 11G, 11H and 11K. The surfaces of the electrode films 11, 11C, 11D, 11G, 11H and 11K may be rubbed in a vertical direction in order to align the elongated crystals of the liquid crystal material adjacent to these electrode films in a vertical direction. As an alternative to the rubbing of the electrode films, alignment films as disclosed in U.S. patent application Ser. No. 242,675, filed Apr. 10, 1972 by the present applicant and assigned to the present assignee, may be placed on the electrode films. Vertically polarized light when passed through the elongated crystals of liquid crystal material adjacent to the vertically rubbed electrode films will remain polarized in a vertical direction. The electrode films 11A, 11B, 11E, 11F, 11I and 11J may be rubbed in a horizontal direction. However in this embodiment, instead of these electrode films being rubbed, a thin alignment film whose surface has alignment growth is in a horizontal direction, is placed upon each of these electrode films. The mechanism by which these alignment films align liquid crystals adjacent to them is disclosed in the cited patent application incorporated herein by reference. As vertically polarized light is transmitted through elongated crystals of the liquid crystal material between adjacent vertical and horizontal alignment films, it is rotated into a horizontal plane. The elongated crystals of the liquid crystal material are rotated between the adjacent vertical and horizontal alignment films.

In FIG. 1, alignment films 16 through 16K are shown deposited respectively upon the electrode films 11 through 11K. The alignment films 16, 16C, 16D, 16G, 16H and 16K respectively have vertical alignment growth 19, 19C, 19D, 19G, 19H and 19K to form vertical alignment directions for crystals of liquid material. The alignment crystal films 16A, 16B, 16E, 16F, 16I and 16J respectively have horizontal alignment growth 19A, 19B, 19E, 19F, 19I and 19J to form horizontal alignment directions for elongated crystals of liquid crystal material. The alignment growth 19 of the alignment film 16 is pointing in a direction at right angle to the direction of the alignment growth 19A of the alignment film 16A, due to arrangement of the surfaces 10 and 10A during the fabrication of the liquid crystal display cell 30. Similarly, the alignment films on surfaces 10E and 10F are in a direction at 90° with respect to the direction of alignment films on surfaces 10D and 10G. Further, the alignment films on surfaces 10I and 10J are in a direction at 90° with respect to the direction of the alignment on surfaces 10H and 10K.

As shown in FIG. 1 nematic liquid crystal material 22, such as nematic bilevel material, which may be a mixture by weight of 32% methoxybenzilidene-n-butylaniline, 58% ethoxybenzilidene-n-butylaniline and 10% p-n-butoxybenzilidene-p'-aminobenzonitrile, is used between the silicon monoxide alignment films 16 and 16A prior to final sealing of the liquid crystal display device 30. A sealer is then placed around the periphery of the glass surfaces 10 and 10A to seal liquid crystal material 22 within a formed liquid crystal display cell 40. Similarly, liquid crystal materials 22A, 22B, 22C, 22D and 22E is placed between the alignment films on the other panels of the liquid crystal display device 30 to form liquid crystal display cells 42, 44, 46, 48 and 49. One-half mil thick spacers separate each two adjacent alignment films. Elongated crystals of the liquid crystal material 22 in the liquid crystal display cell 40 have their longitudinal axes aligned sympathetically to the direction of the silicon monoxide film alignment growth 19 interfacing alignment film 16, and elongated crystals of the liquid crystal material 22 in the corresponding liquid crystal display cell 40 have their longitudinal axes aligned in a direction parallel to the direction of the platinum film alignment growth 19A interfacing the alignment film 16A. The liquid crystal material 22 will thus rotate or twist vertically polarized light passing through the cell 40 by 90° since the elongated crystals of the liquid crystal material 22 of the liquid crystal display cell 40 are rotated by 90° across cell 40. Similarly, liquid crystal materials 22A, 22B, 22C, 22D and 22E of cells 42, 44, 46, 48 and 49 will rotate polarized light passed through each of them, by 90°, since the elongated crystals of the liquid crystal material of cells 42, 44, 46, 48 and 49 of liquid crystal display device 30 are rotated by 90°.

FIGS. 2 and 3 show the transparent electrode films 11C and 11G on surfaces 10C and 10G. FIG. 4 shows the alignment film 16I on surface 10I.

In FIG. 1, the liquid crystal display device 30 is used in a liquid crystal display apparatus 31 which includes a light source 32, such as an incandescent lamp, a collimating lens 34 which collimates light 33 from the light source 32, and an optical filter 35 which filters out the ultra violet and infrared light from light 33, a polarizer 36 which is used to polarize the light 33, polarizer 38 which is used to analyze the plane in which light 33 is polarized after it has passed through liquid crystal display device 30, and voltage sources 62, 64, 66, 68, 70 and 72. A screen 41 is used to display a bright image from device 30 of any of the six numerals formed by applying a voltage from a source connected between adjacent surfaces which have an etched transparent electrode and an unetched transparent electrode respectively. The voltage sources may provide a voltage from about 5 to 20 volts D.C. or about 20 to 100 hertz A.C. The background of the pattern of the numeral 1 is etched away from the electrode film 11C, previously deposited as by evaporation on the surface 10C of the liquid crystal display device 30 by standard photoetching technique, to leave the pattern of the numeral 1. A thin silicon monoxide alignment film 16C covers the surface 10C, including the numeral 1. Another similar alignment film 16B covers unetched electrode film 11B on the surface 10B. The numeral 1 in the transparent electrode film 11C is very thin requiring only enough material for electrical conduction with good optical transmission properties. The film growths 19B and 19C of the two alignment films 16B and 16C are at right angles. Elongated crystals of the liquid crystal material 22A are aligned sympathetically with the alignment films 16B and 16C.

A bright image of the numeral 1 may be read out on the dark screen 41 of the display device 30 after placing the display device 30 between the polarizers 36 and 38, with the direction of the film growth 19C of the alignment film 16C parallel to the plane of polarization of the polarizer 36, with switch 51 closed and with the other switches 50, 52, 54, 56 and 58 open. With switch 51 closed to create an electric field between the numeral 1 and electrode film 11B of the cell 42 of the liquid crystal display device 30, all the elongated crystals of the portion of the liquid crystal material 22A in the display device 30 between the numeral 1 and the electrode film 11B are oriented parallel to the electric field. Polarized light is therefore not rotated by liquid crystal material 22A adjacent the numeral 1 with switch 51 closed. The polarized light passing through the display device 30 in the area of transparent numeral 1 is thus rotated five times by 90° by the other cells 40, 44, 46, 48 and 49 and will come out of polarizer 38. The polarized light passing through display device 30, but not in the area of numeral 1, is rotated six times by 90° by all of the cells of device 30 and is blocked by polarizer 38. Thus an image 43 of a 1 appears on a screen 41. When switch 51 is opened, the bright numeral 1 disappears from the screen 41 since the polarized light through the complete area of device 30 is now rotated six times by 90°. Numerals 0, 1, 2, 7, 8 or 9 may thus be read out of the liquid crystal display device 30 by respectively closing switches 50, 51, 52, 54, 56 or 58 to respectively energize cells 40, 42, 44, 46, 48 or 49.

FIG. 5 shows a portion of the liquid crystal display device 30 with the edges of certain transparent panels being sealed, and with liquid crystal material between these transparent panels. Sealant such as epoxy may be placed around the edges of adjacent stacked transparent panels used in device 30.

What is claimed is:

1. A liquid crystal display device, comprising:
   a. a plurality of transparent support panels positioned in spaced parallel planes along a common axis to form a plurality of discrete cells;
   b. a transparent electrode film coated on adjacent facing surfaces of the support panels, each electrode film conforming to a particular different character; and
   c. a plurality of alignment means deposited on respective electrode films in a direction which makes an acute angle with respect to the surfaces of the support panels;
   d. the alignment means arranged in alternately displaced directions of alignment about the common axis whereby when liquid crystal material, having an elongated crystalline structure, is added to the discrete cells, the longitudinal axis of the crystalline material adjacent each alignment means is oriented in the direction of the adjacent alignment means and the longitudinal axis of the liquid crystalline material adjacent one alignment means is oriented in a direction perpendicular to the longitudinal axes of the liquid crystalline material adjacent the next facing alignment means.

2. The device of claim 1 wherein the alignment means is a vacuum deposited alignment film.

3. The device of claim 1 wherein the liquid crystal material is nematic liquid crystal material.

4. The device of claim 1 wherein the transparent supportive panels are glass panels.

5. The device of claim 1 wherein the transparent electrode films are selected from the group consisting of tin oxide, indium oxide and cadmium oxide electrode films.

6. A liquid crystal display apparatus, comprising:
   a. a liquid crystal display device having a plurality of transparent support panels positioned in spaced parallel planes along a common axis to form discrete cells; a transparent electrode film coated on adjacent facing surfaces of the support panels, each electrode film having the configuration of a particular different character; a plurality of alignment means disposed on respective transparent electrode films and support panels in a direction which makes an acute angle with respect to the surfaces of the support panels, each successive alignment means arranged in alternately displaced directions; and liquid crystal material having elongated crystals disposed within each cell, the liquid crystal material adjacent each alignment means having their longitudinal axes oriented in the direction of alignment of the adjacent alignment means;
   b. a first polarizer adjacent one end of the device; and
   c. a second polarizer adjacent the other end of the device;
   d. the alignment means arranged in alternately displaced directions of alignment about the common axis to cause the longitudinal axis of the liquid crystalline material adjacent one alignment means to be oriented in a direction perpendicular to the longitudinal axes of the liquid crystalline material adjacent the next facing alignment means.

7. A liquid crystal display apparatus, comprising:
   a. a liquid crystal display device having a plurality of transparent support panels positioned in spaced parallel planes along a common axis to form discrete cells; a transparent electrode film coated on adjacent facing surfaces of the support panels, each electrode film having the configuration of a particular different character; alignment means disposed on respective transparent electrode films and support panels in a direction which makes an acute angle with respect to the surfaces of the support panels in alternately displaced directions of alignment; liquid crystal material having an elongated crystalline structure disposed within each cell, wherein the longitudinal axes of the crystalline material adjacent each alignment means have their longitudinal axes oriented in the direction of that alignment means;
   b. a first polarizer adjacent one end of the device;
   c. a second polarizer adjacent the other end of the device;
   d. a voltage source; and
   e. a switch means for selectively connecting the voltage source to selected adjacent facing transparent electrode films;
   f. the alignment means arranged in alternately displaced directions of alignment about the common axis to cause the longitudinal axis of the liquid crystalline material adjacent one alignment means to be oriented in a direction perpendicular to the longitudinal axes of the liquid crystalline material adjacent the next facing alignment means.

* * * * *